(12) United States Patent  (10) Patent No.: US 7,252,170 B2
Miyakozawa et al.  (45) Date of Patent: Aug. 7, 2007

(54) STRUCTURE FOR DISPOSING FUEL TANK FOR STRADDLE-TYPE VEHICLE

(75) Inventors: Oki Miyakozawa, Shizuoka (JP); Mitsuru Sakamoto, Shizuoka (JP); Masataka Taketsuna, Shizuoka (JP); Yuuji Shimizu, Shizuoka (JP); Masatsugu Arimura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 120 days.

(21) Appl. No.: 10/961,477

(22) Filed: Oct. 8, 2004

(65) Prior Publication Data

US 2005/0110265 A1  May 26, 2005

(30) Foreign Application Priority Data

Oct. 10, 2003  (JP) .............................. 2003-351696

(51) Int. Cl.
*B62D 61/02* (2006.01)
*B62K 11/00* (2006.01)
*B62M 7/00* (2006.01)
*B60P 3/22* (2006.01)

(52) U.S. Cl. ...................... 180/219; 280/835; 224/413

(58) Field of Classification Search ................ 180/219; 280/835; 224/413
See application file for complete search history.

(56) References Cited

U.S. PATENT DOCUMENTS 4,449,723 A * 5/1984 Shiratsuchi .................. 280/833
4,469,190 A * 9/1984 Yamaguchi .................. 180/219
6,341,792 B1 * 1/2002 Okuma ..................... 280/304.3

FOREIGN PATENT DOCUMENTS

JP  05-008780  1/1993
JP  08-034379  2/1996

* cited by examiner

*Primary Examiner*—Lesley D. Morris
*Assistant Examiner*—Marc A. Scharich
(74) *Attorney, Agent, or Firm*—Hogan & Hartson LLP

(57) ABSTRACT

A fuel tank for a straddle-type vehicle includes a two-piece structure made up of a lower panel and an upper panel, each panel having a flange which is formed at a side peripheral edge thereof and joined with the other flange to form the fuel tank, and side portions provided with tank side covers each having a specified vertical width to cover the flanges. The fuel tank is located in a manner such that the upper panel is exposed upward at an upper surface portion.

14 Claims, 28 Drawing Sheets

STRUCTURE FOR DISPOSING FUEL TANK FOR STRADDLE-TYPE VEHICLE

BACKGROUND OF THE INVENTION

1. Field of the Invention

The present invention relates to a structure for disposing a fuel tank for a straddle-type vehicle such as a motorcycle.

2. Description of the Related Art

A conventional fuel tank for a motorcycle has a tank outer plate and a tank bottom plate which are seam-welded together, and a projecting fuel cock formed on the tank bottom plate. The fuel tank at the side of seam-welding portions is integrally formed with extended members projecting downward below the fuel cock. The extended members are provided with mounting portions of a front cowling and a side cover.

When the fuel tank is removed from the body and placed on the ground or the like without using any jigs or the like, the extended members of the seam-welding portions function as the legs of the fuel tank so that the fuel cock can be protected. In addition, the extended members can also be used for mounting and supporting the front cowling and the side cover.

Another conventional fuel tank is mounted on a motorcycle having a pair of main frames which extend to the rear of the body from a head pipe. The fuel tank has a configuration such that it is at least partially interposed between the pair of main frames and divided into an upper and a lower part, and the mating faces of the upper and the lower parts are positioned in the vicinity of the upper edges of the main frames. Further, a protection member is fitted on the mating faces.

However, in the former conventional fuel tank, the seam-welding portions of the tank outer plate and the tank bottom plate hang there and are integrally formed with the extended members projecting downward below the fuel cock. The extended members are formed with the mounting portions of the front cowling and the side cover. Thus, it is difficult to form the seam-welding portions on the tank outer plate and the tank bottom plate, respectively, with good accuracy by press forming. Also, when the tank bottom plate and the tank outer plate are seam-welded together with the seam-welding portions aligned with each other, the tank bottom plate must be fitted in the tank outer plate in position. However, when the tank outer plate and the tank bottom plate are not formed with a high degree accuracy, an optimum fit cannot be provided, or even when both plates are successfully fitted together, a gap may occur between the seam-welding portions resulting in a problem of difficulty in forming.

Further, in the latter conventional fuel tank, the protection member is fitted on the mating faces projecting from the side of the fuel tank which is divided into an upper and a lower part. The protection member prevents the fuel tank from being in surface contact with the main frame so that no vibration is directly transmitted from the body to the fuel tank. The protection member also prevents the flanges of the fuel tank from directly interfering with rider's legs when he/she rides on the vehicle. The protection member, however, only provides such functions, and attaching the protection member does not necessarily provide a good appearance.

In view of the foregoing, it is, therefore, an advantage of the present invention to provide a fuel tank capable of being easily formed and to provide a structure for disposing a fuel tank for a straddle-type vehicle capable of improving quality in appearance of a portion where the fuel tank is disposed.

SUMMARY OF THE INVENTION

In order to solve the foregoing problems, an embodiment of the present invention provides a structure for disposing a fuel tank for a straddle-type vehicle which is located closely behind a head pipe of the straddle-type vehicle and exposed upward at the upper surface side. The fuel tank has a two-piece structure made up of a lower panel and an upper panel, each having a flange which is formed at the side peripheral edge thereof and joined with the other flange to form the fuel tank. The fuel tank is located in a manner such that the upper panel is exposed upward at the upper surface portion, and in which the fuel tank at the side portions is provided with tank side covers each having a specified vertical width to cover the flange.

An embodiment of the present invention provides a structure for disposing a fuel tank for a straddle-type vehicle which is located closely behind a head pipe of the straddle-type vehicle and exposed upward at the upper surface side. The fuel tank has a two-piece structure made up of a lower panel and an upper panel, each having a flange which is formed at the side peripheral edge thereof and joined with the other flange to form the fuel tank. The fuel tank is located in a manner such that the upper panel is exposed upward at the upper surface portion, and in which the upper surface portion of the upper panel assumes a mountainous shape in a section taken along the lateral direction of the vehicle, with a line which runs in the longitudinal direction of the vehicle, as an edge line.

A further embodiment of the present invention provides a structure for disposing a fuel tank for a straddle-type vehicle which is located closely behind a head pipe of the straddle-type vehicle and exposed upward at the upper surface side. The fuel tank has a two-piece structure made up of a lower panel and an upper panel, each having a flange which is formed at the side peripheral edge thereof and joined with the other flange to form the fuel tank. The fuel tank is located in a manner such that the upper panel is exposed upward at the upper surface portion, and in which the upper surface portion of the upper panel assumes a mountainous shape in a section taken along the lateral direction of the vehicle. The dimension R of the mountainous top is smaller than the height, the distance from the bottom to the top, of the fuel tank.

The fuel tank is disposed to be inclined along main frames extending obliquely downward to the rear from the head pipe. Also, the fuel tank is formed to be sloped such that the flanges at the front edge side are placed at a lower position than at the rear edge side when the fuel tank is placed with the upper surface portion positioned generally horizontally.

The front edge of the flanges is mounted on the main frames at the inclined portions, and the rear edge of the flanges is mounted on seat frames for supporting a seat, at the horizontal portions.

According to an embodiment of the present invention, the tank side cover at the lower end side extends downward of the fuel tank, while seat side covers are disposed at the sides of the seat behind the fuel tank, and the seat side cover at the mounting portion and the extended portion of the tank side cover, at the mounting portion, are fastened together to the body frame. An storage box is disposed in a space defined closely behind the head pipe and between the fuel tank and an engine, and the regions on the sides of the storage box are covered with removable storage box side covers.

According to an embodiment of the present invention, the fuel tank has the two-piece structure made up of the lower panel and the upper panel. Thus, compared with the one made up of three parts seam-welded together, the number of parts can be reduced, effort can be saved in welding and finishing processes, and reduction in the number of press dies provides reduction in die cost. Further, since the lower and the upper panels are joined together at the flanges formed at the side peripheral edges, the fuel tank is easily formed. Further, since the fuel tank is divided into the lower and the upper panels, which means that no welding portions are formed in the upper surface portion, the upper surface portion can be formed in any desired shape, which improves flexibility in molding. Further, while the lower panel and the upper panel at the side peripheral edges are formed with the flanges, the flanges are covered with the tank side covers having a specified vertical width so that they can be reliably covered. This ensures quality in appearance, compared with when a protection member having a small width is fitted as in the prior art.

Also, according to an embodiment of the present invention, the upper surface portion of the upper panel assumes a mountainous shape in a section taken along the lateral direction of the vehicle, with the line which runs in the longitudinal direction of the vehicle, as the edge line. This can improve the rigidity of the fuel tank and allows a sharp design, which improves quality in appearance.

In a further embodiment of the present invention, the upper surface portion of the upper panel assumes a mountainous shape in a section taken along the lateral direction of the vehicle, and the dimension R of the mountainous top is smaller than the height, the distance from the bottom to the top, of the fuel tank. This can also improve the rigidity of the fuel tank and allows a sharp design, which improves quality in appearance.

According to an embodiment of the present invention, the fuel tank is disposed to be inclined along the main frames extending obliquely downward to the rear from the head pipe, and the fuel tank is formed to be sloped such that the flanges at the front edge side are placed at a lower position than at the rear edge side when the fuel tank is placed with the upper surface portion positioned generally horizontally. This allows the front edge of the flanges to be mounted to the main frames and the rear edge, to the seat frames, which improves strength required to support the fuel tank.

According to an embodiment of the present invention, the front edge of the flanges is mounted on the main frames at the inclined portions, and the rear edge of the flanges is mounted on the seat frames for supporting the seat, at the horizontal portions. The fuel tank can thus be mounted on the body frame.

According to an embodiment of the present invention, the seat side cover at the mounting portion and the extended portion of the tank side cover, at the mounting portion, are fastened together to the body frame. This can reduce the man-hour required for mounting works and improve the accuracy in aligning the mating portions of the seat side cover with the tank side cover, which improves quality in appearance.

In a further embodiment of the present invention, the storage box is disposed in the space defined closely behind the head pipe and between the fuel tank and the upper part of the engine, and the regions on the sides of the storage box are covered with the removable storage box side covers. This allows the effective use of the space and thus to secure the storage space.

DETAILED DESCRIPTION OF THE INVENTION

An embodiment of the present invention will be described below.

FIGS. 1 through 28 show an embodiment of the present invention.

Figure 1:
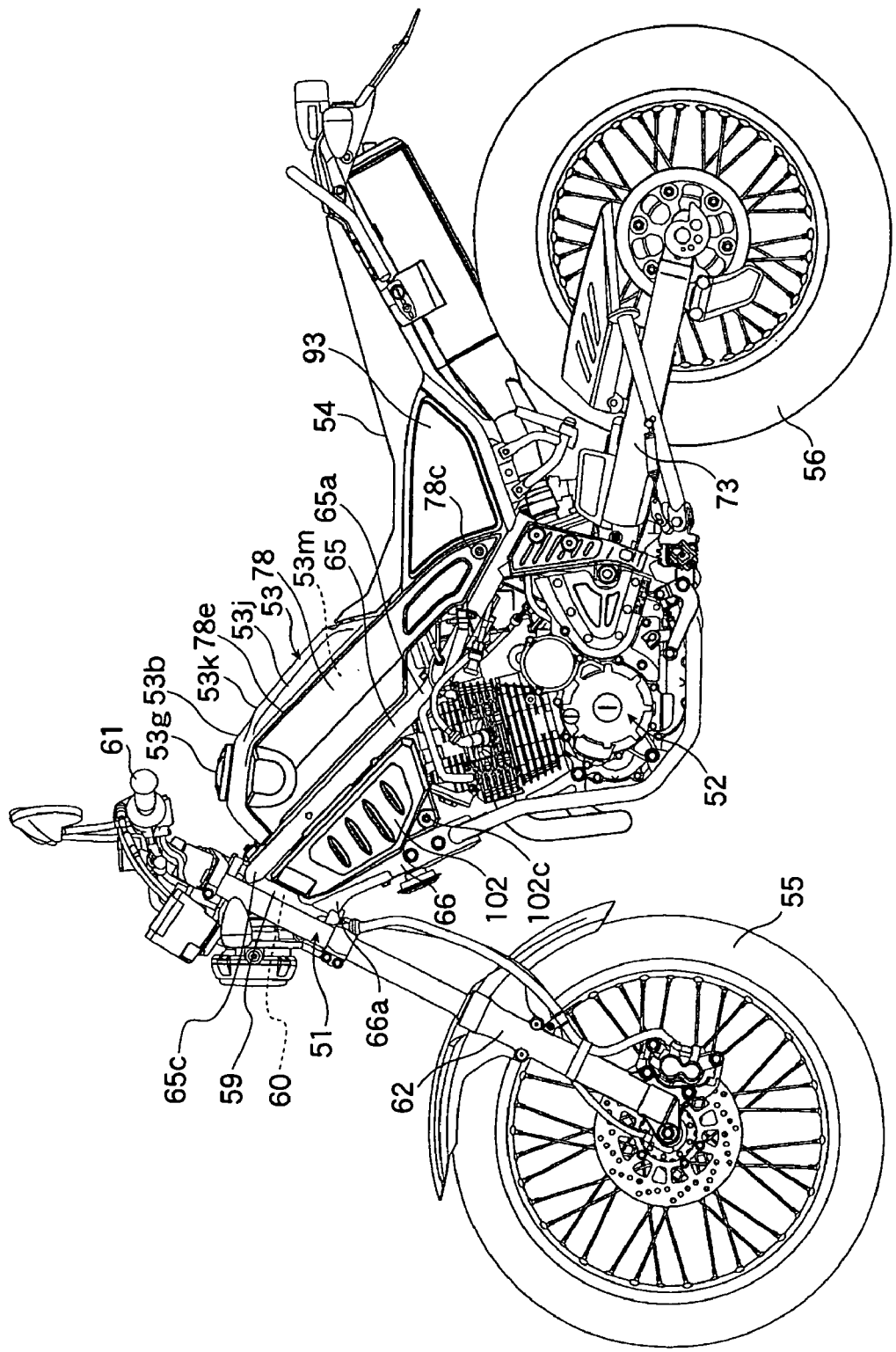
FIG. 1 is a side view of a motorcycle according to an embodiment of the present invention.

The configuration of this embodiment will be first described. FIG. 1 shows a motorcycle as a "straddle-type vehicle." This motorcycle is a so-called on- and off-road vehicle capable of running mainly on an unpaved road with a rough surface. It is designed to be small in width and weight, compared with the motorcycle designed for running on an ordinary road, in consideration of handleability of the body during running.

More specifically, reference numeral 51 in FIG. 1 denotes a body frame. An engine 52 is mounted on the body frame 51. A fuel tank 53 and a seat 54 are placed above the engine 52 and behind the fuel tank 53, respectively. Further, a front wheel 55 and a rear wheel 56 are disposed forward and rearward of the body frame 51, respectively.

Figure 2:
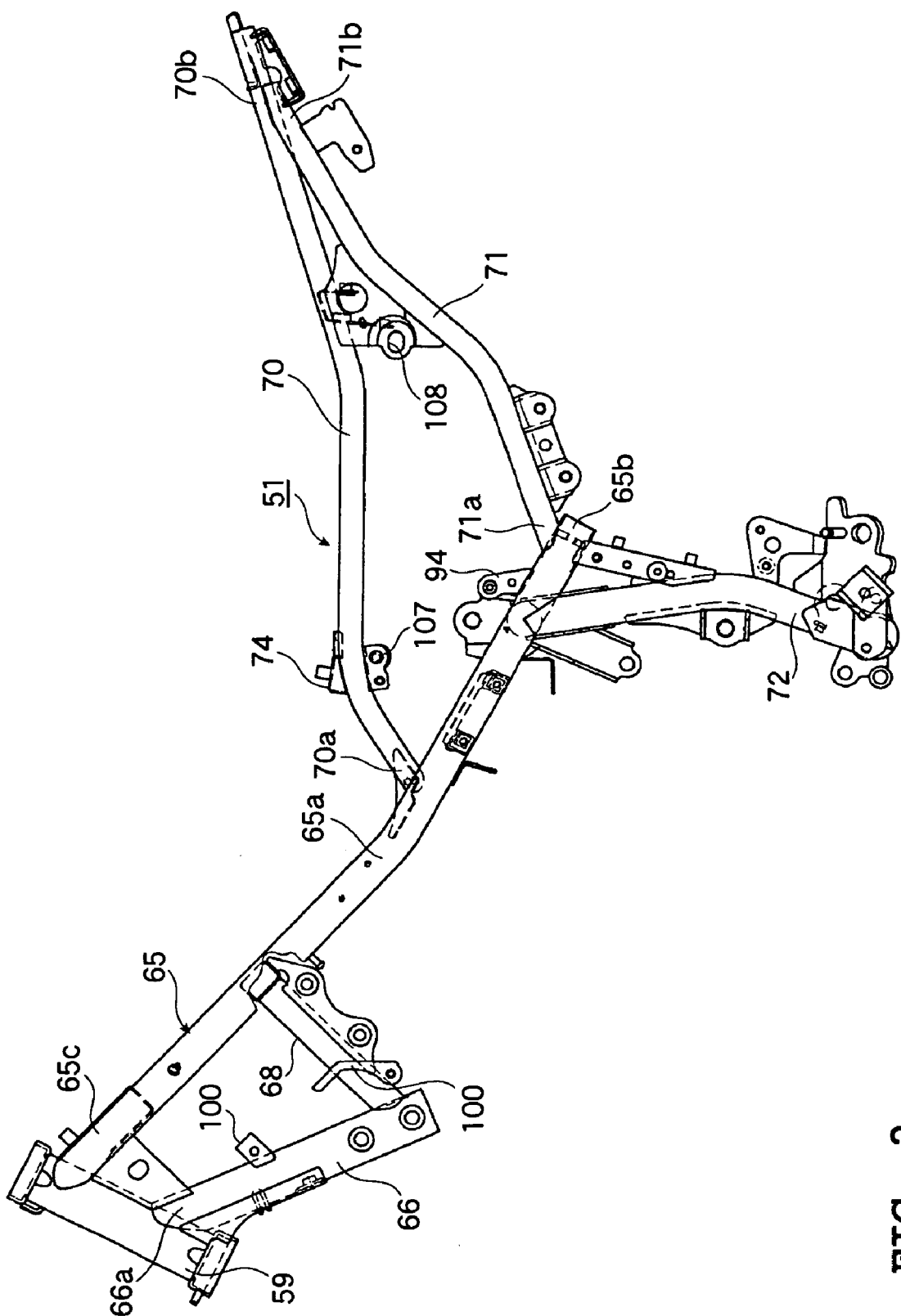
FIG. 2 is a side view of a body frame according to the embodiment of the present invention.
Figure 3:
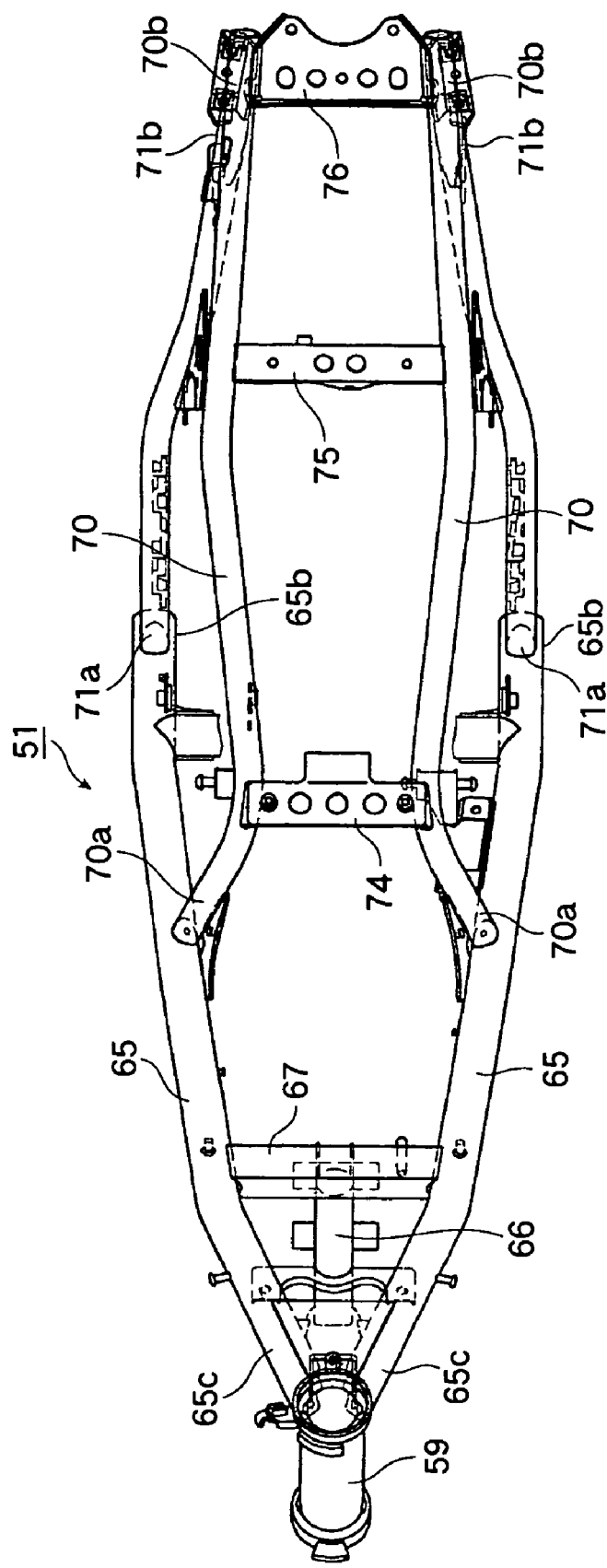
FIG. 3 is a plan view of the body frame according to the embodiment of the present invention.

As shown in FIGS. 2 and 3, the body frame 51 has a cylindrical head pipe 59 at the front end thereof. A steering shaft 60 is supported by the head pipe 59 for free rotation. The steering shaft 60 has a pair of handlebars 61 mounted at the upper end, and a pair of left and right front forks 62 mounted at the lower end. The front wheel 55 is rotatably supported between the front forks 62.

The head pipe 59 is fixed to the front ends 65c of a pair of left and right main frames 65, which extends obliquely downward to the rear. A single down tube 66 is disposed under the main frames 65 along the central region therebetween with the front end 66a fixed to the head pipe 59.

A horizontal cross member 67 extends between the pair of left and right main frames 65, and a vertical cross member 68 extends between the horizontal cross member 67 and the down tube 66.

The main frame 65 is slightly bent at the middle portion 65a, as shown in FIG. 2. The main frames 65 at the regions closely behind the middle portions 65a are fixed to the front ends 70a of a pair of left and right seat frames 70, which extend obliquely upward to the rear.

Further, a pair of left and right reinforcing frames 71 is disposed under the seat frames 70. The reinforcing frames 71 have their front ends 71a fixed to the rear ends 65b of the main frames 65 and extend obliquely upward to the rear. The rear ends 71b of the reinforcing frames 71 are fixed under the rear ends 70b of the seat frames 70, respectively.

Further, a support frame 72 extends downward from the main frame 65 at the region closely forward of the rear end 65b. The rear wheel 56 is supported for free vertical swinging movement by the support frame 72 through a rear arm 73.

A plurality of cross members 74, 75, 76 extend between the pair of left and right seat frames 70, as shown in FIG. 3.

The fuel tank 53 is disposed at a position corresponding to the region on and between the pair of main frames 65 of the body frame 51.

Figure 5:
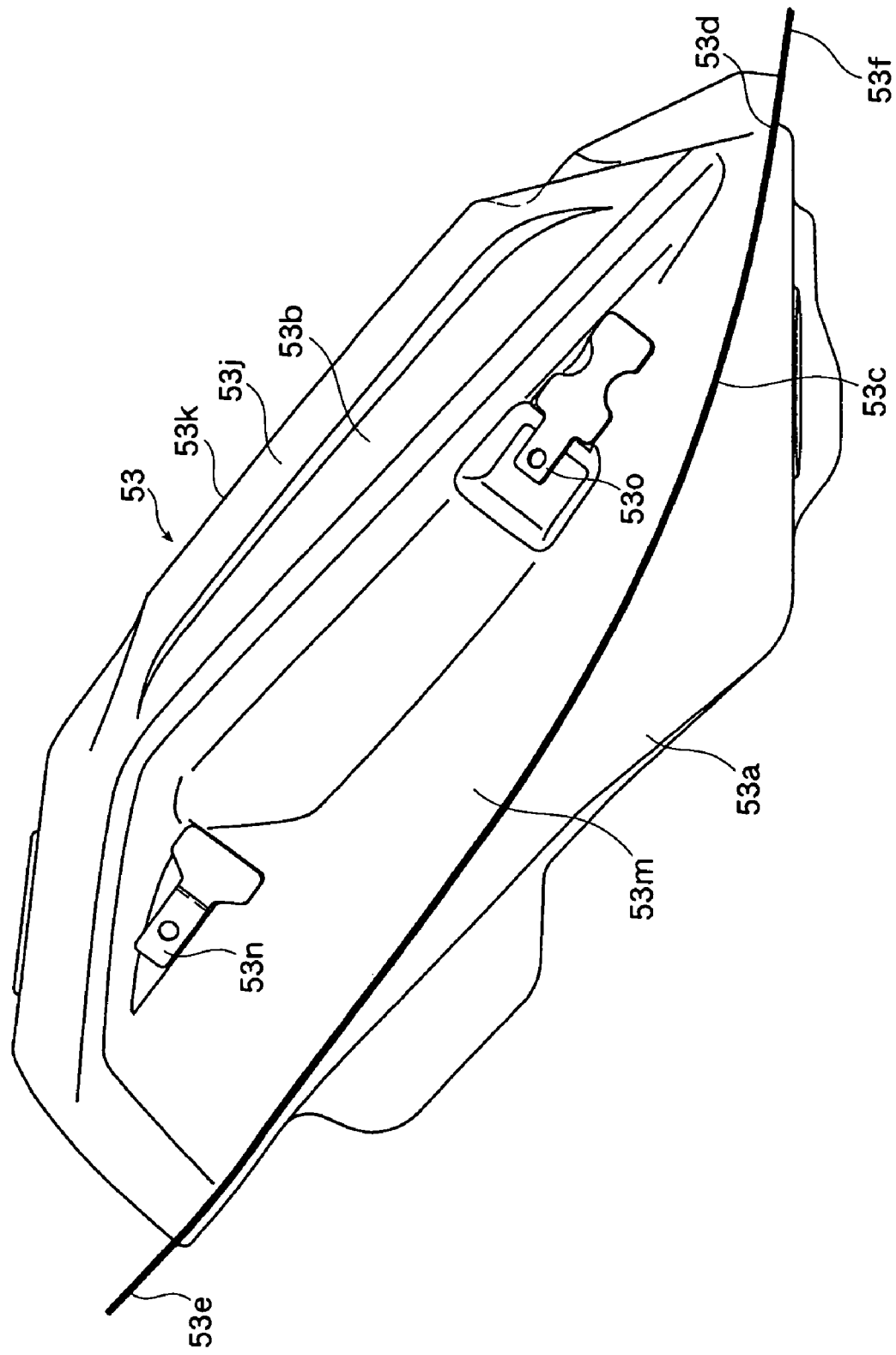
FIG. 5 is a side view of the fuel tank according to the embodiment of the present invention.
Figure 6:
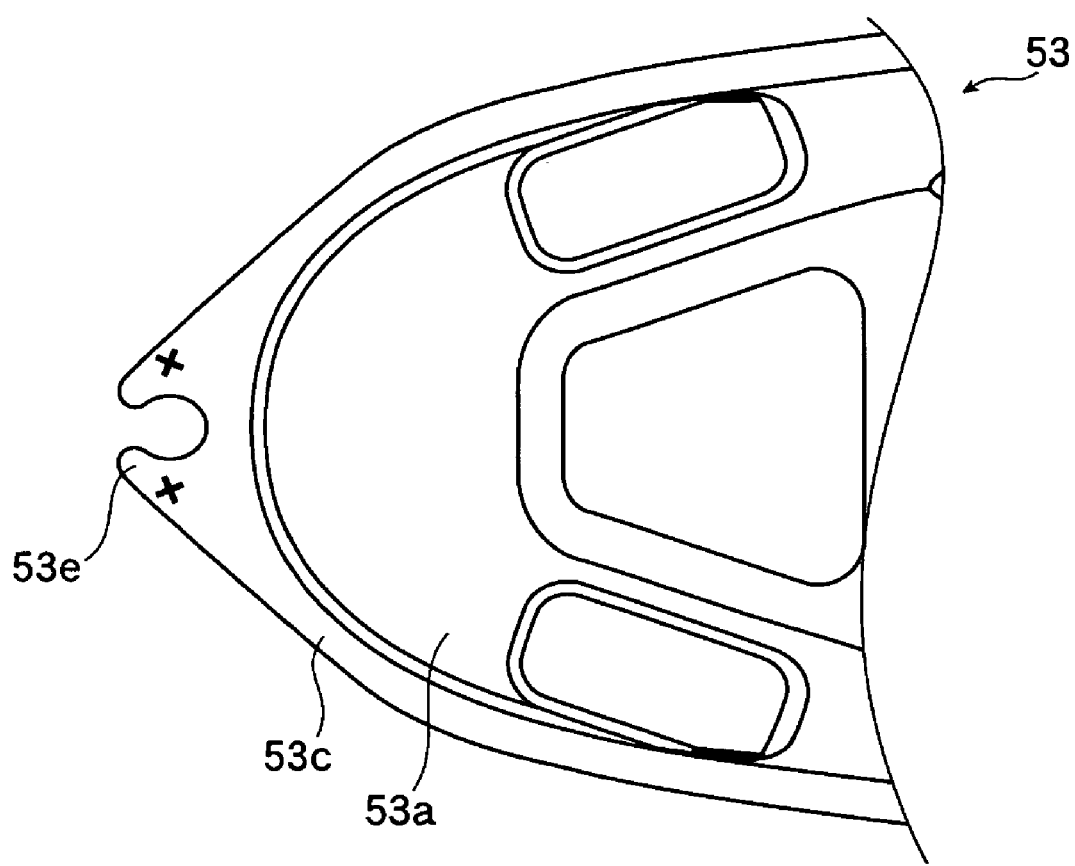
FIG. 6 is a bottom view of the fuel tank according to the embodiment of the present invention at the front side.
Figure 7:
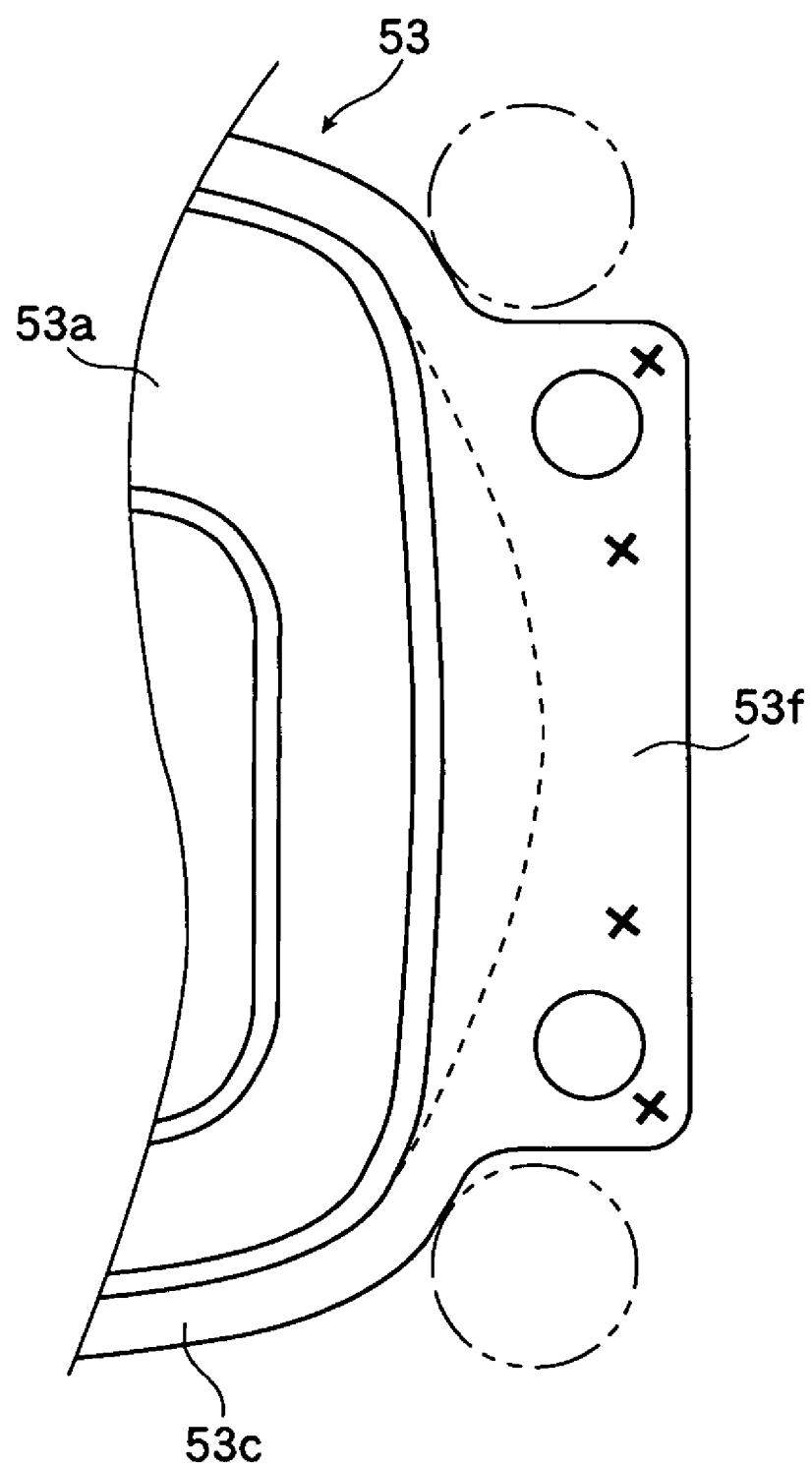
FIG. 7 is a bottom view of the fuel tank according to the embodiment of the present invention at the rear side.

More specifically, the fuel tank 53 has a configuration such that it is divided into two parts, a lower panel 53a defining the lower part and an upper panel 53b defining the upper part, as shown in FIGS. 5 through 7. The fuel tank 53 is formed in a way such that flanges 53c, 53d formed at the side peripheral edges of the panels 53a, 53b, respectively, are joined together by welding.

The flanges 53c, 53d are formed in a manner such that the flanges at the front edge 53e side are placed at a lower position and at the rear edge 53f side are placed at a higher position when the fuel tank 53 is horizontally placed, and the flanges between the front edge 53e and the rear edge 53f are curved. Thus, when the fuel tank 53 is placed to be inclined, the front edge 53e is also inclined along the main frames 65, and the rear edge 53f is positioned horizontally.

The upper panel 53b of the fuel tank 53 is provided with a removable fuel cap 53g, at the upper surface portion 53j on the front edge side. The lower panel 53a of the fuel tank 53 is provided with a fuel cock 53h, at the bottom surface on the rear edge side. Fuel is fed from the fuel cock 53h to the engine 52 through a tube 53i.

The upper surface portion 53j of the upper panel 53b assumes a mountainous shape in the section taken along the lateral direction of the vehicle, with a line which runs in the longitudinal direction of the vehicle along the central portion in the lateral direction, as an edge line 53k.

Figure 11:
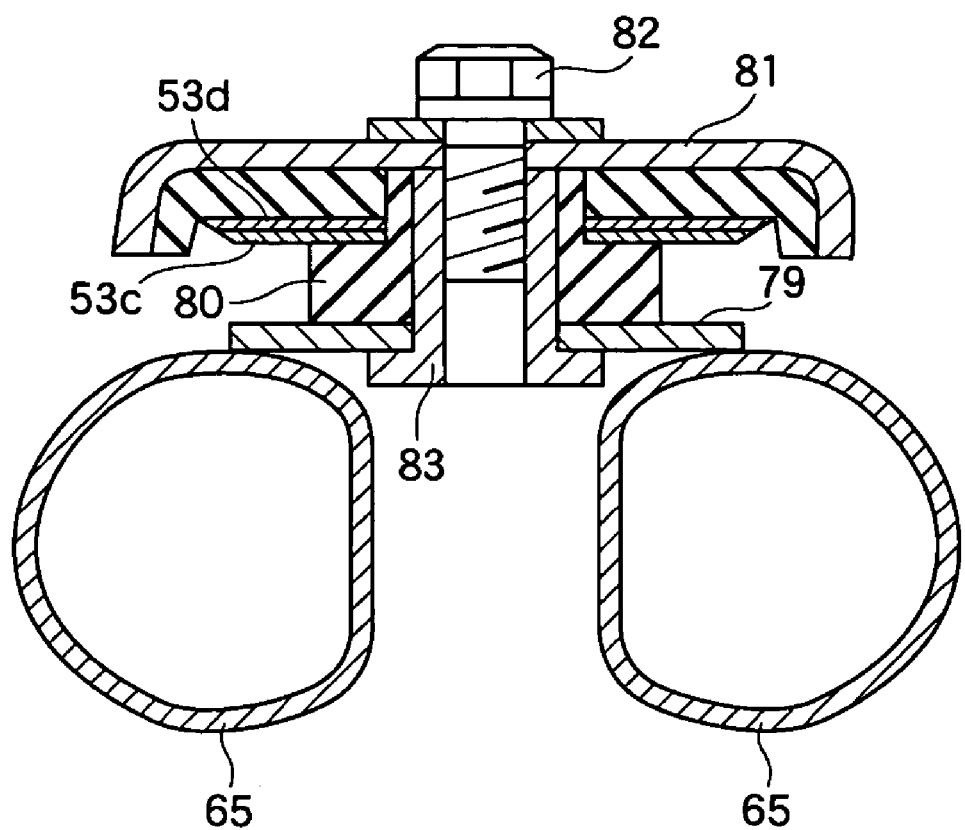
FIG. 11 is a sectional view, taken along line C-C of FIG. 4 according to the embodiment of the present invention.
Figure 12:
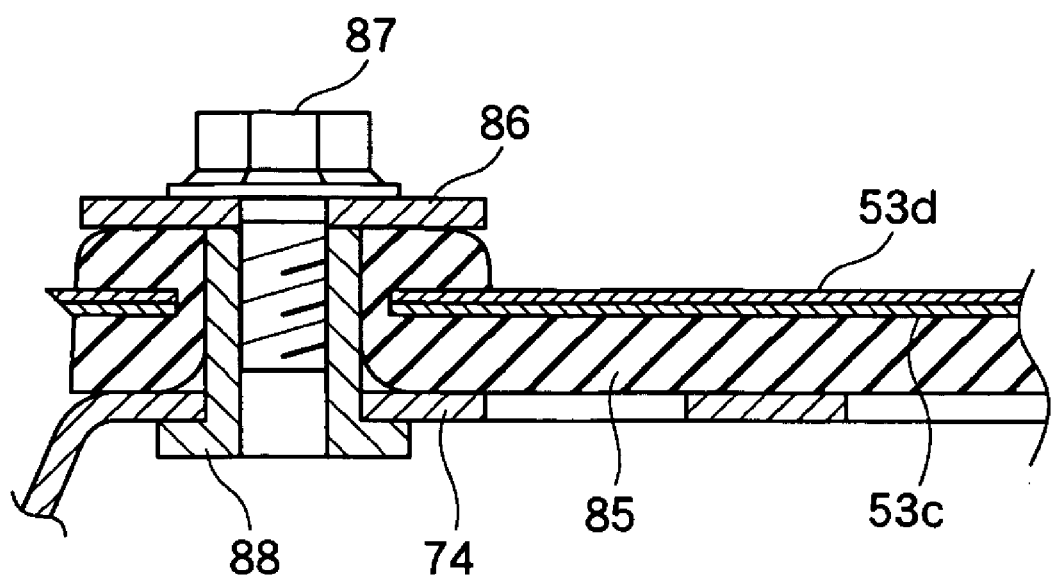
FIG. 12 is a sectional view, taken along line D-D of FIG. 4 according to the embodiment of the present invention.

Such fuel tank 53 is supported by the body frame 51, with the front edge 53e mounted as shown in FIG. 11 and the rear edge 53f mounted as shown in FIG. 12.

More specifically, the front edge 53e is mounted as shown in FIG. 11 in a way such that a support bracket 79 extends between the front ends 65c of the pair of main frames 65 and is fixed thereto. The flanges 53c, 53d of the fuel tank 53, at the front edge 53e, are supported by the support bracket 79 through a shock absorber 80. A washer 81 is placed on the front edge 53e through the shock absorber 80 and these components are secured together by a bolt 82 and a nut 83.

The rear edge 53f is mounted as shown in FIG. 12 in a way such that the flanges 53c, 53d of the fuel tank 53, at the rear edge 53f, are placed on the cross member 74 which extends between the seat frames 70, through a shock absorber 85. A washer 86 is disposed on the shock absorber 85 and these components are secured together by a bolt 87 and a nut 88.

The fuel tank 53 is thus located on the main frames 65 at an angle at which the main frames 65 are located.

Figure 4:
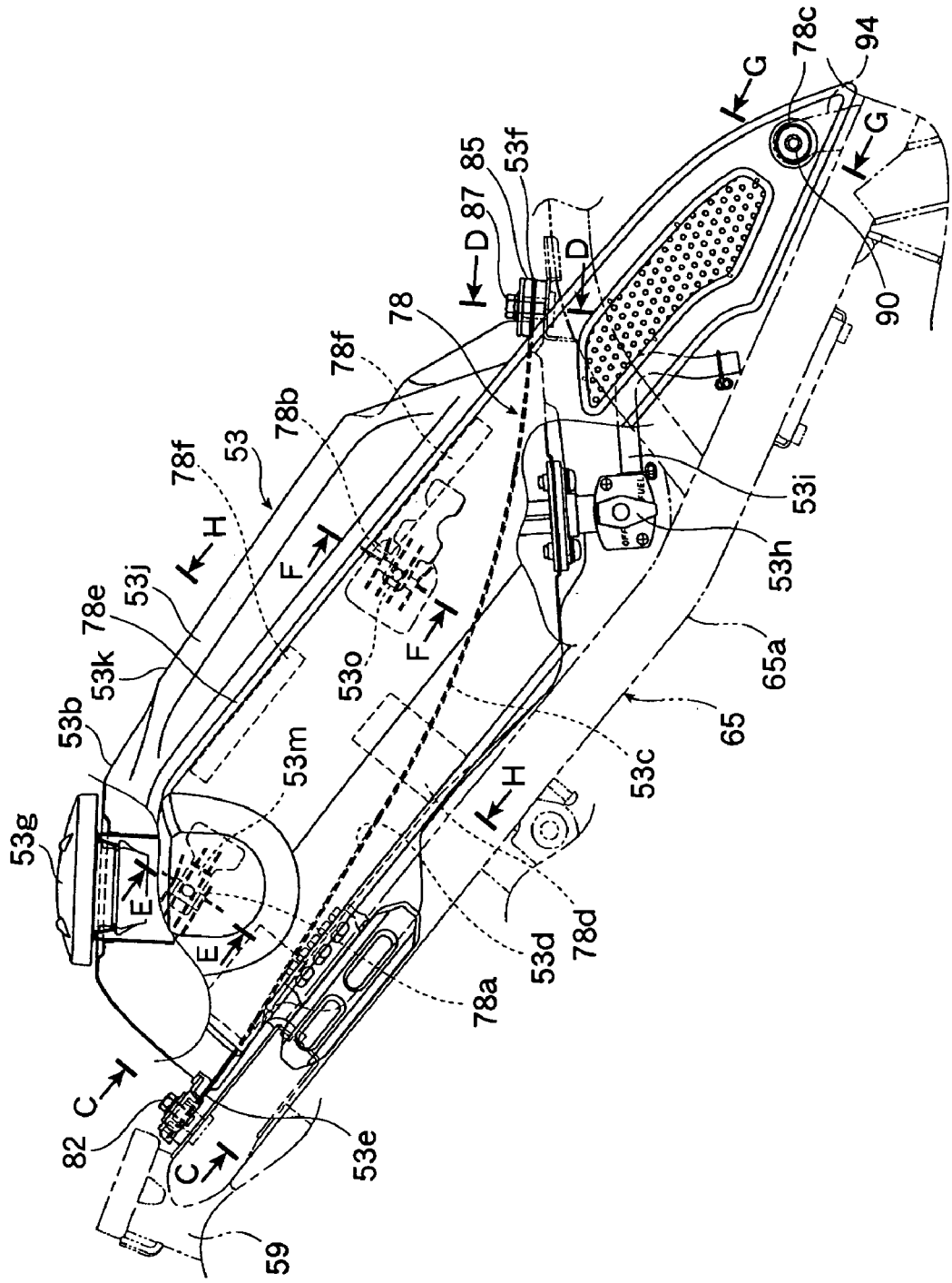
FIG. 4 is a partially cutaway side view, showing a portion where a fuel tank according to the embodiment of the present invention is disposed.

The fuel tank 53 located in such a manner as described has opposite side portions 53m provided with tank side covers 78, as shown in FIGS. 1 and 4. More specifically, the tank side cover 78 assumes the shape of an elongated plate having a specified vertical width so large as to cover the curved flanges 53c, 53d when it is disposed on the side portion 53m of the fuel tank 53, as shown in FIGS. 8 through 10.

Figure 8:
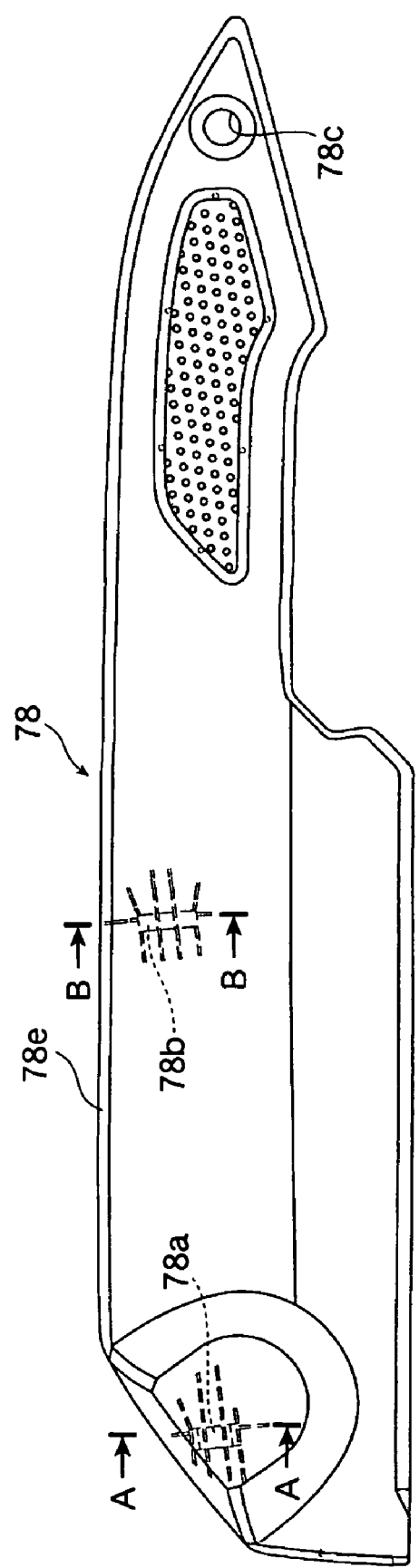
FIG. 8 is a side view of a tank side cover according to the embodiment of the present invention.
Figure 9:
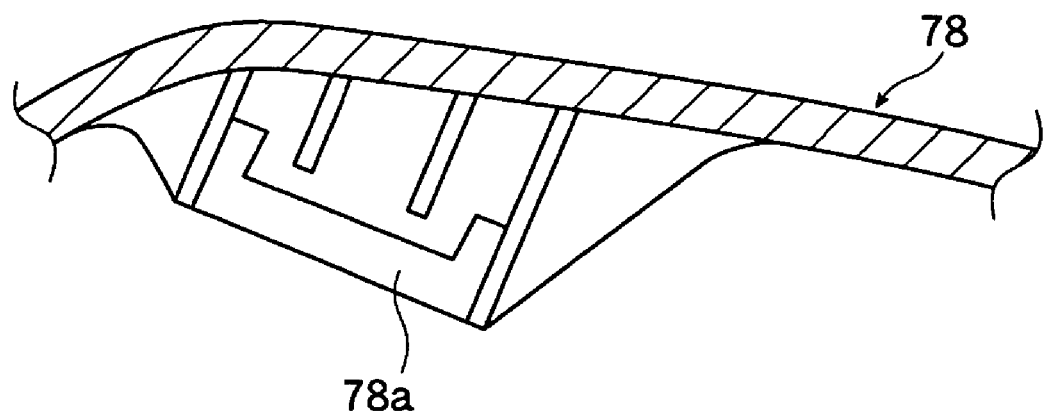
FIG. 9 is a sectional view, taken along line A-A of FIG. 8 according to the embodiment of the present invention.
Figure 10:
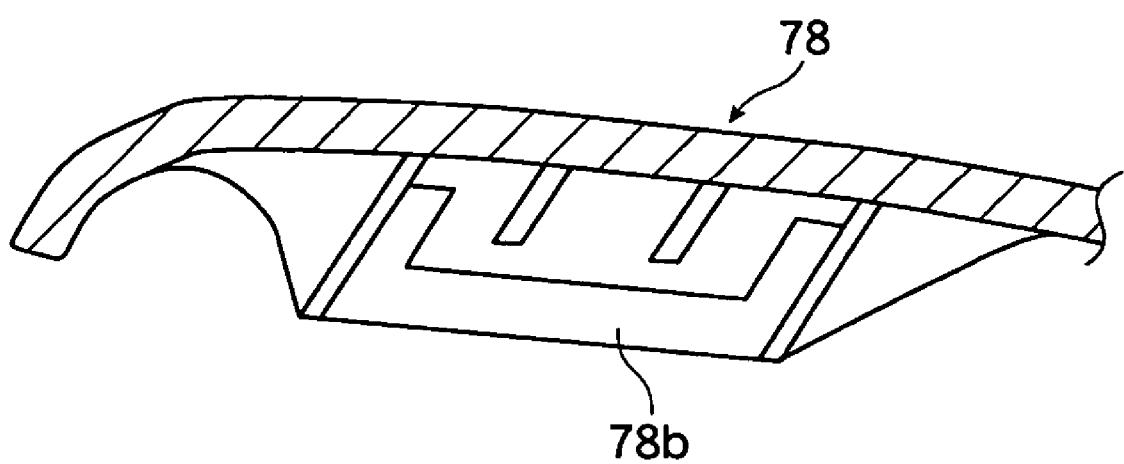
FIG. 10 is a sectional view, taken along line B-B of FIG. 8 according to the embodiment of the present invention.
Figure 13:
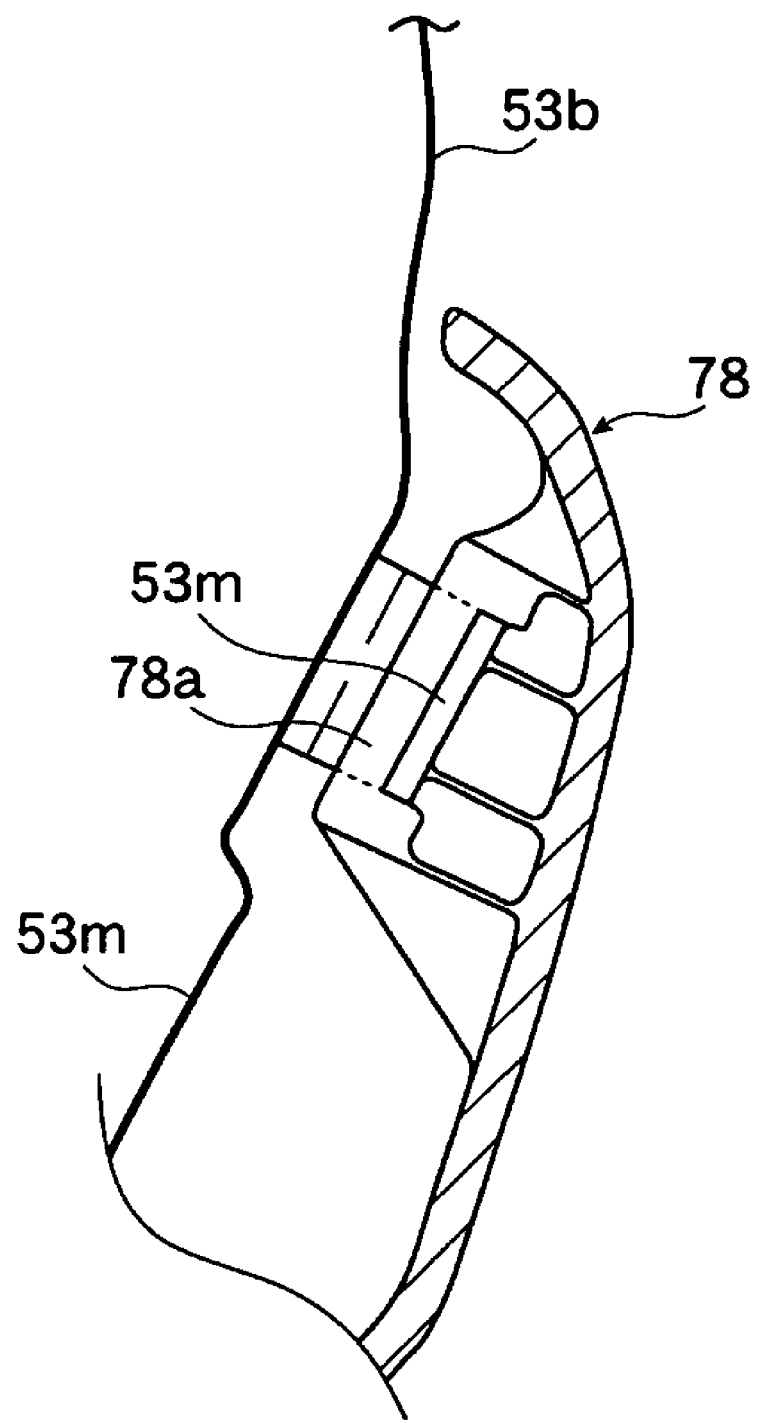
FIG. 13 is a sectional view, taken along line E-E of FIG. 4 according to the embodiment of the present invention.
Figure 14:
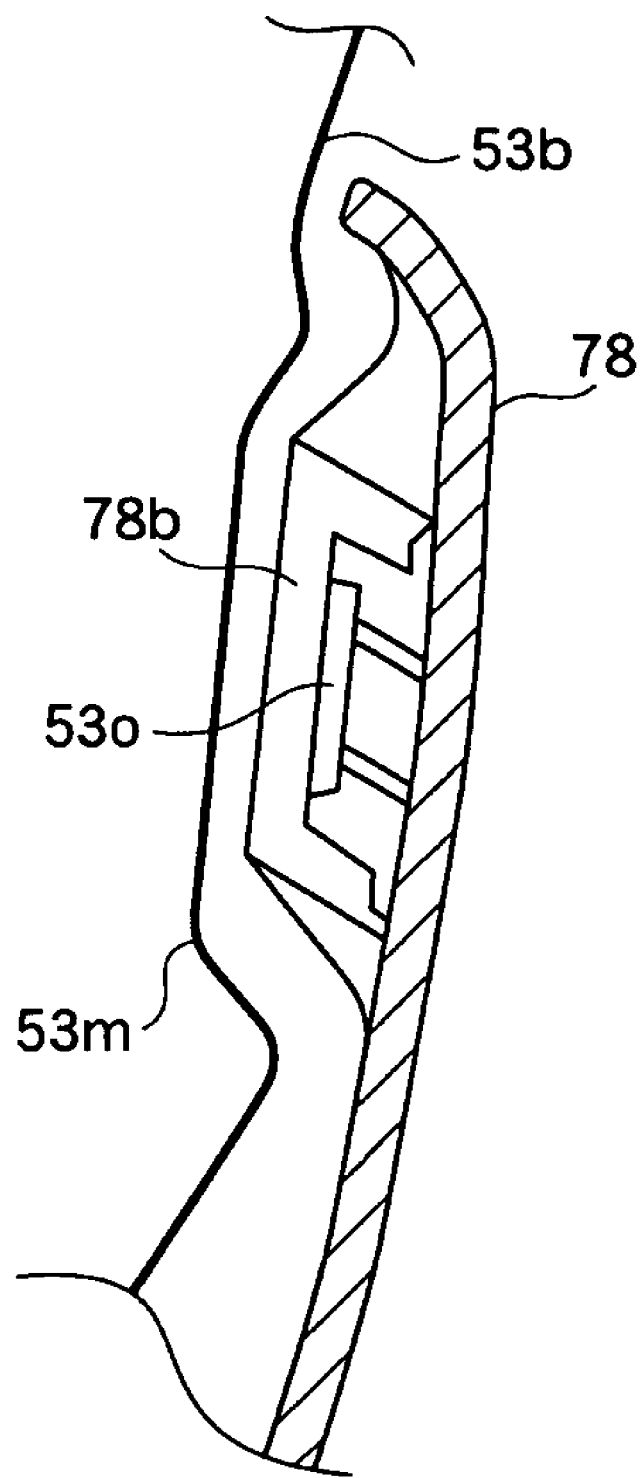
FIG. 14 is a sectional view, taken along line F-F of FIG. 4 according to the embodiment of the present invention.
Figure 15:
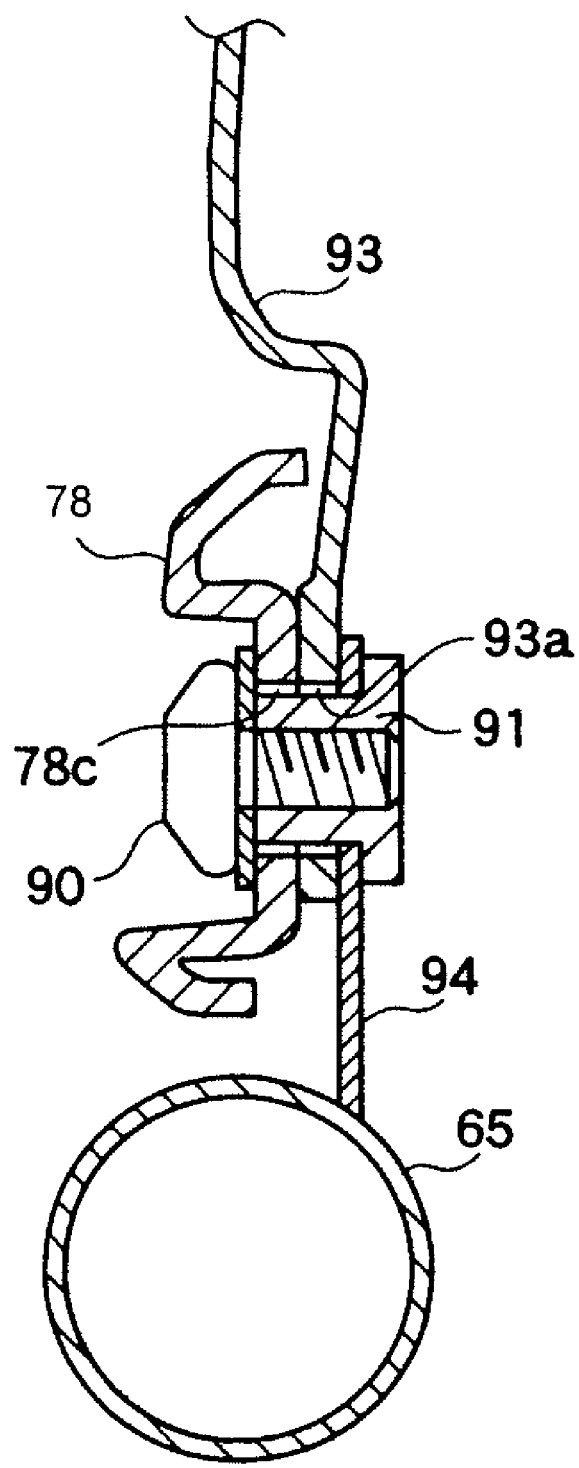
FIG. 15 is a sectional view, taken along line G-G of FIG. 4 according to the embodiment of the present invention.

The tank side cover 78 is formed with retained portions 78a, 78b, at the backside of the front end and the middle portion, respectively, as shown in FIGS. 8 through 10. Retaining members 53n, 53o formed at the side portion 53m of the fuel tank 53 are inserted and retained in the retained portions 78a, 78b, respectively, as shown in FIGS. 13 and 14.

In addition, the tank side cover 78 is formed with a mounting hole 78c as a "mounting portion," at its rear end. A seat side cover 93 disposed behind the tank side cover 78 and at the side of the seat 54 is also formed with a mounting hole 93a as a "mounting portion." The tank side cover 78 and the seat side cover 93 are fastened together to a bracket 94 fixed to the main frame 65, with a bolt 90 and a nut 91 inserted in the mounting holes 78c, 93a of the tank side cover 78 and the seat side cover 93.

Figure 16:
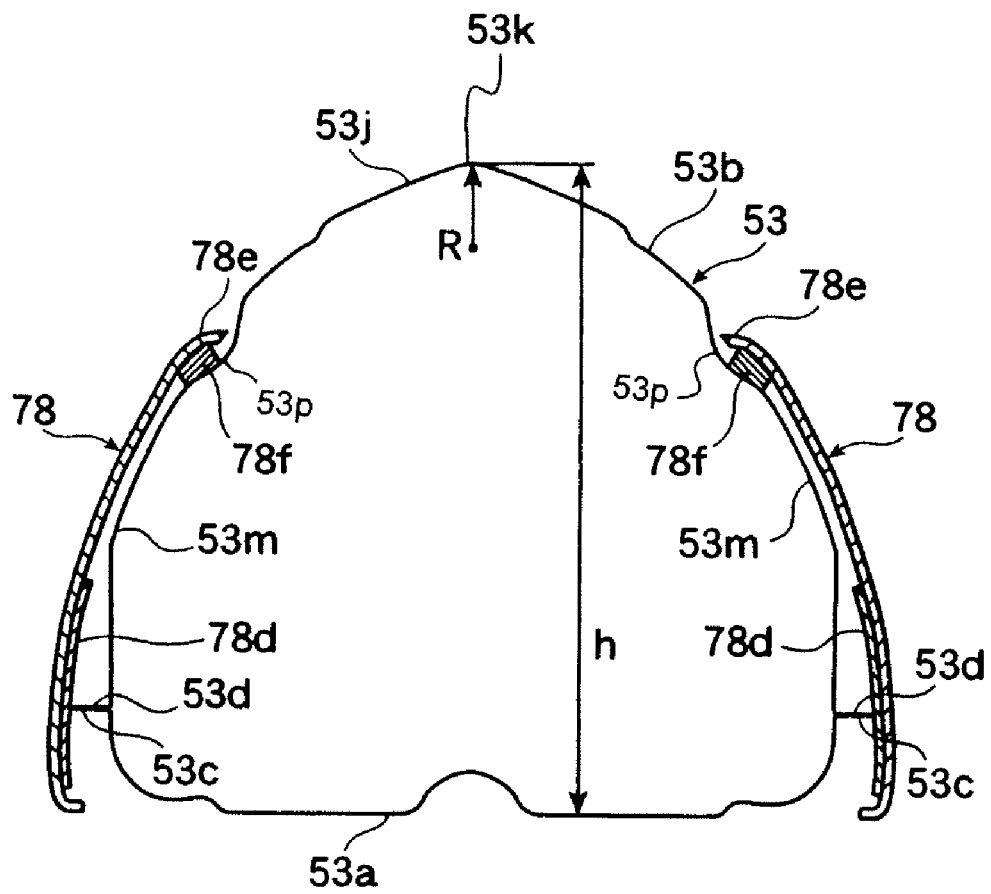
FIG. 16 is a sectional view, taken along line H-H of FIG. 4 according to the embodiment of the present invention.

The tank side cover 78 mounted in such a manner as described is disposed on the main frame 65 at an angle equal to the angle at which the main frame 65 is located. When the tank side cover 78 is thus mounted, an elastic member 78d is in contact with the flanges 53c, 53d, and an elastic member 78f provided on the tank side cover 78 at the upper edge 78e side is in contact with the side portion 53m of the fuel tank 53, as shown in FIG. 16. The elastic member 78f is in contact with a recess 53p formed in the side portion 53m of the fuel tank 53. When the tank side cover is thus mounted, the tank side cover 78 at the surface of the upper edge 78e is generally flush with the fuel tank 53 at the surface of the side portion 53m in the vicinity of the upper side of the upper edge 78e of the tank side cover 78.

Figure 17:
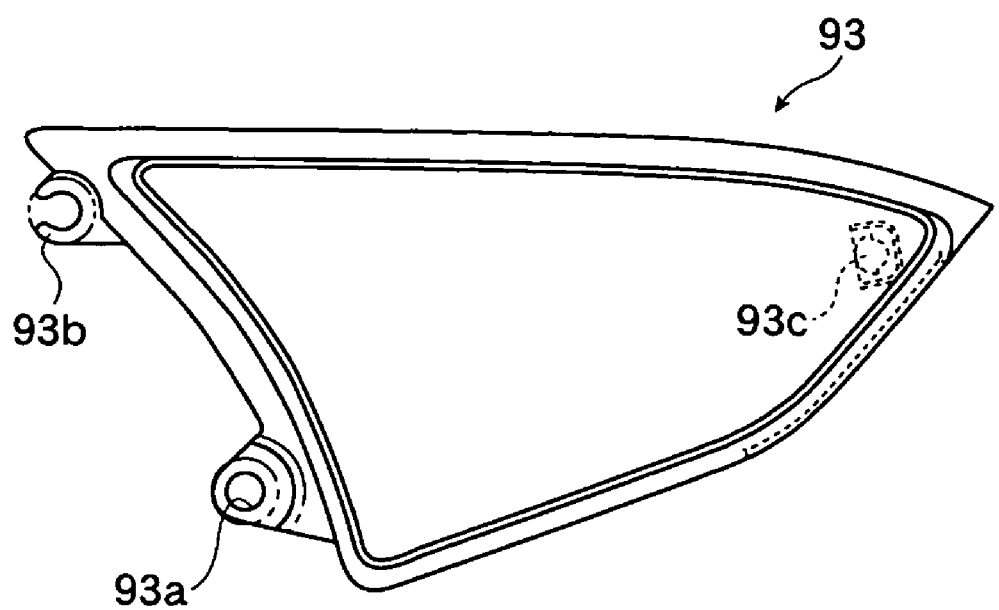
FIG. 17 is a side view of a seat side cover according to the embodiment of the present invention.
Figure 18:
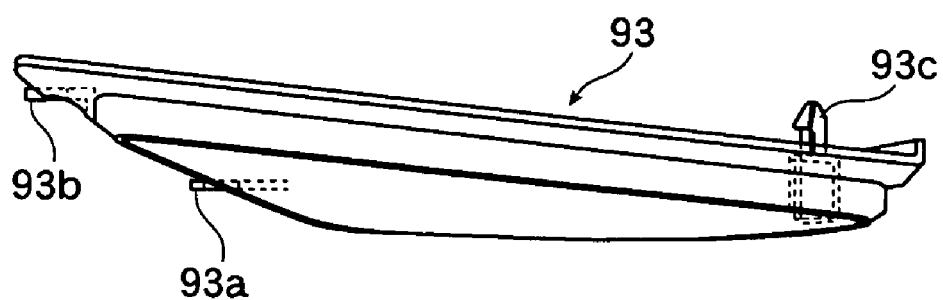
FIG. 18 is a plan view of the seat side cover according to the embodiment of the present invention.

As shown in FIGS. 1, 17 and 18, the seat side cover 93 assumes a generally triangular shape and is formed with the mounting hole 93a, at the lower front edge, and a fitting member 93b, at the upper front edge. Further, the seat side cover 93 at the backside of the rear end is formed with a fitting pin 93c projecting in the lateral direction of the vehicle toward the central portion with respect to the width. A retaining projection 107 of the body frame 51 shown in FIG. 2 is fitted in the fitting member 93b, and the fitting pin 93c is fitted in a slot 108 of the body frame 51 shown in FIG. 2.

Figure 19:
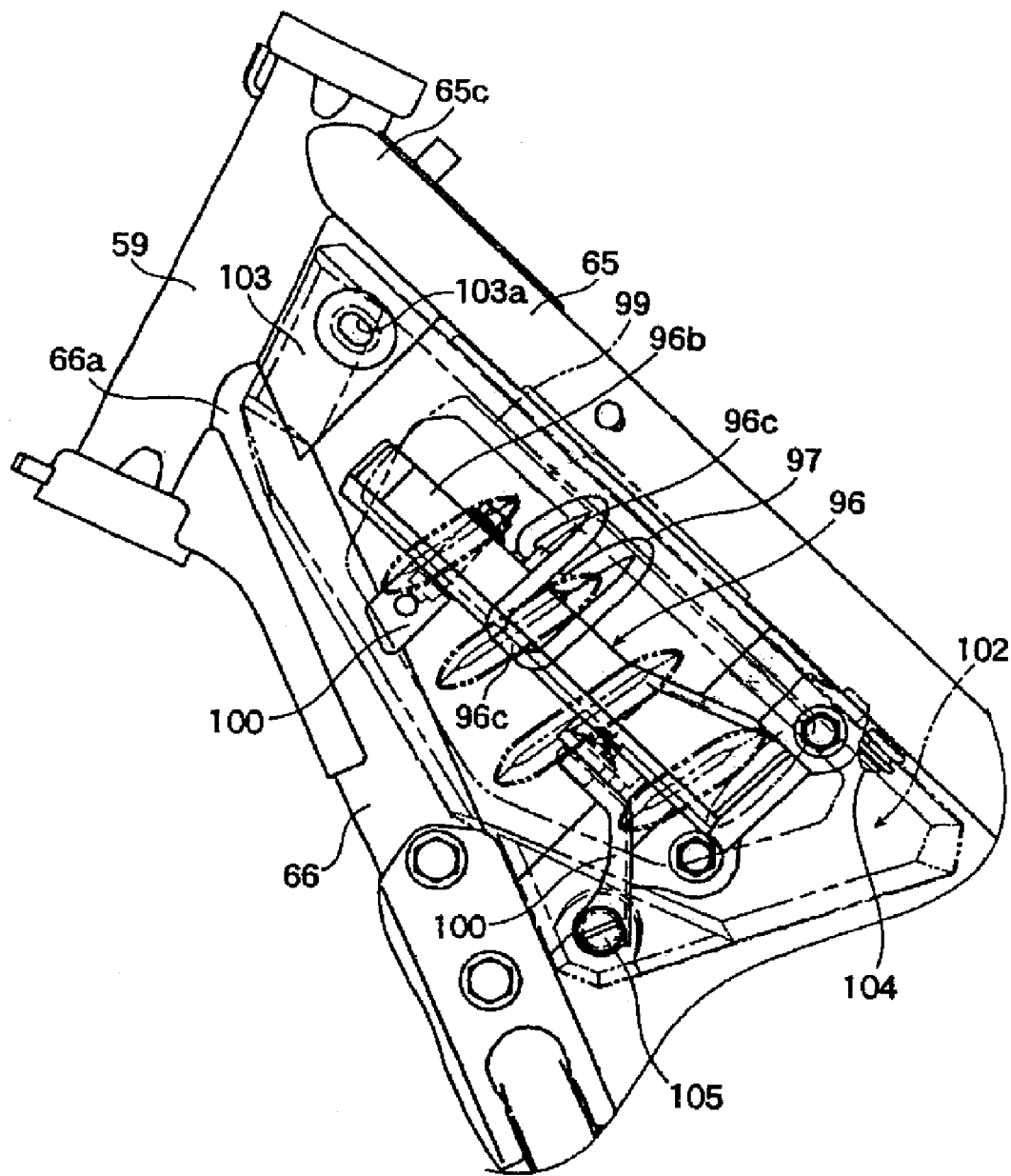
FIG. 19 is a side view showing the state of a storage box according to the embodiment of the present invention being disposed.
Figure 20:
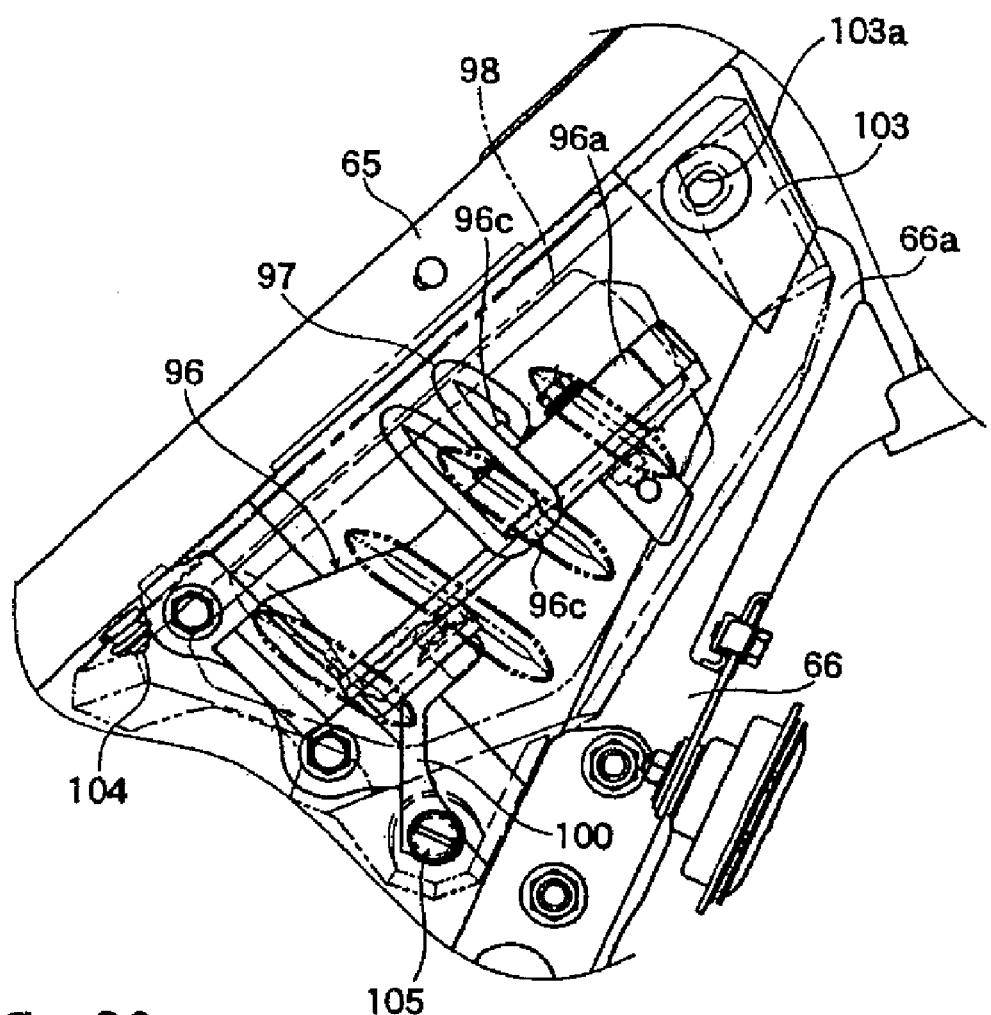
FIG. 20 is a side view, showing the opposite side corresponding to FIG. 19 according to the embodiment of the present invention.
Figure 21:
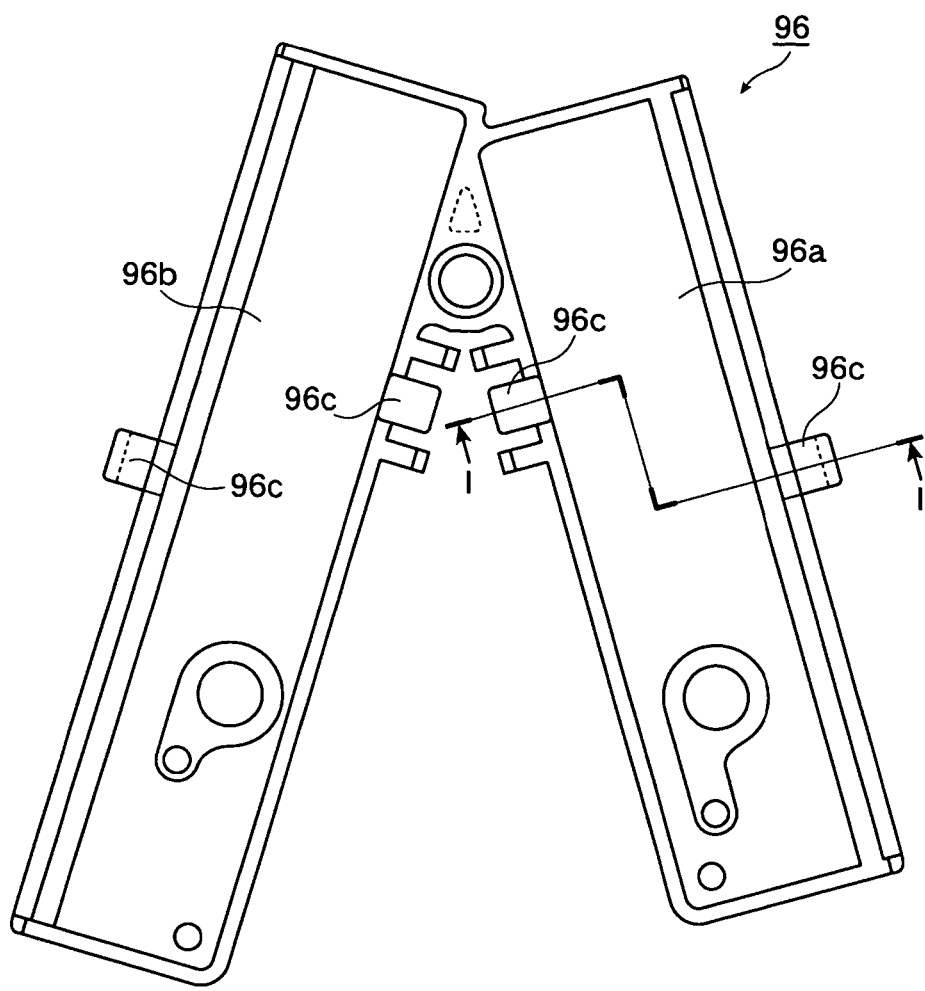
FIG. 21 is a plan view of the storage box according to the embodiment of the present invention.
Figure 22:
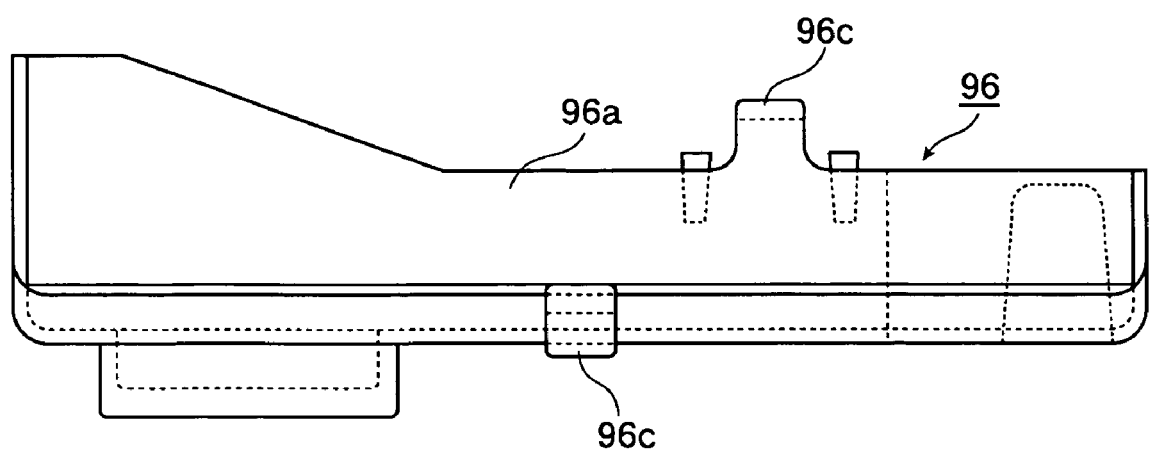
FIG. 22 is a side view of the storage box according to the embodiment of the present invention.
Figure 23:
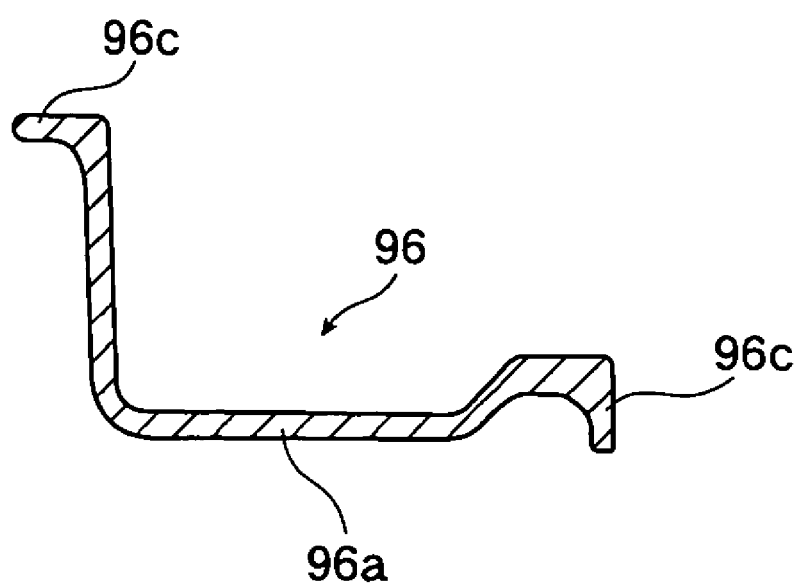
FIG. 23 is a sectional view, taken along line I-I of FIG. 21 according to the embodiment of the present invention.

Meanwhile, a storage box 96 is disposed under the fuel tank 53 at the front edge side, as shown in FIGS. 19 and 20. More specifically, the storage box 96 has a toolbox section 96a and a portfolio section 96b connected together by casting generally in an inverted V shape, as shown in plan view in FIG. 21. The toolbox section 96a and the portfolio section 96b are each formed with hook members 96c.

The storage box 96 is positioned between the main frames 65 and the down tube 66 in a way such that it is mounted to a plurality of brackets 100 fixed to the down tube 66 and the like, through bolts.

A band 97 is retained by the hook members 96c so that manuals and the like 99 are held in the portfolio section 96b, as shown in FIG. 19, and a tool 98 is held in the toolbox section 96a, as shown in FIG. 20.

A pair of storage box side covers 102 is positioned on the left and right sides of the storage box 96, to cover the regions between the main frames 65 and the down tube 66.

Figure 24:
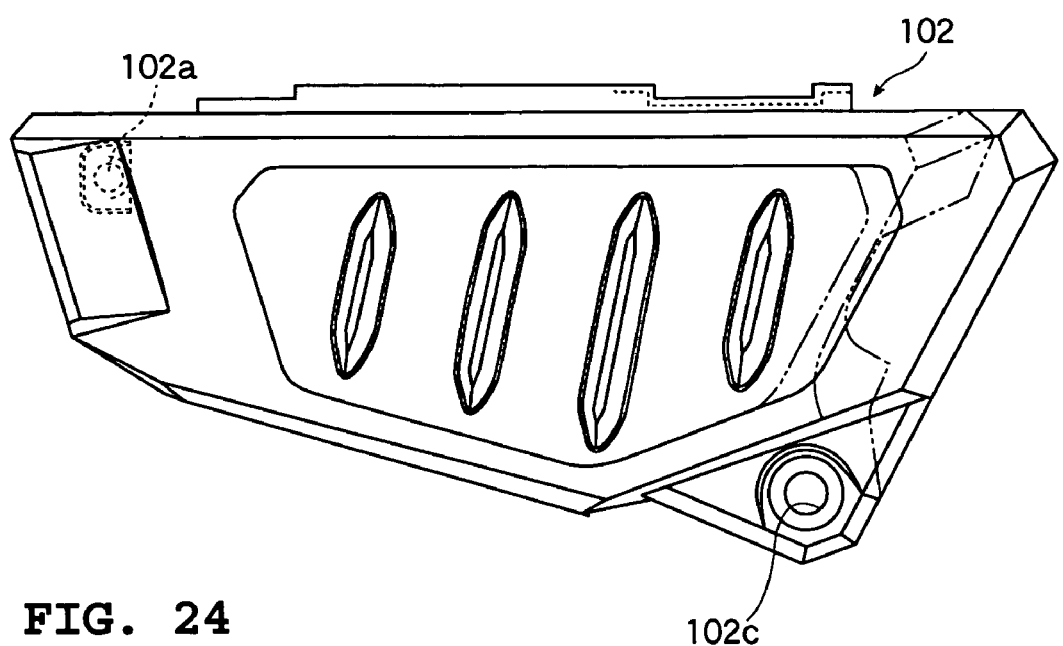
FIG. 24 is a side view of a storage box side cover according to the embodiment of the present invention.
Figure 25:
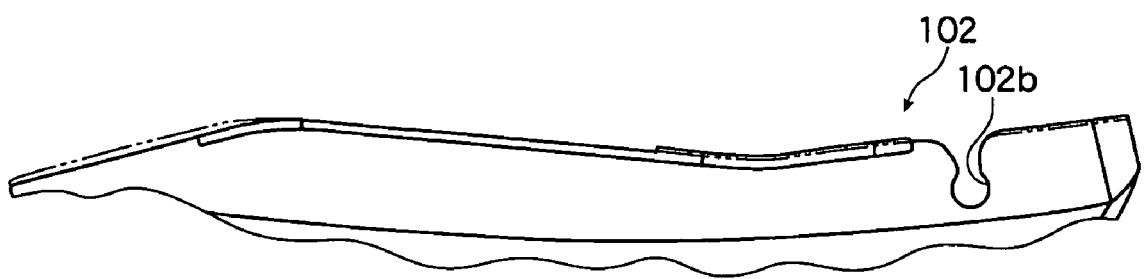
FIG. 25 is a plan view of the storage box side cover according to the embodiment of the present invention.
Figure 26:
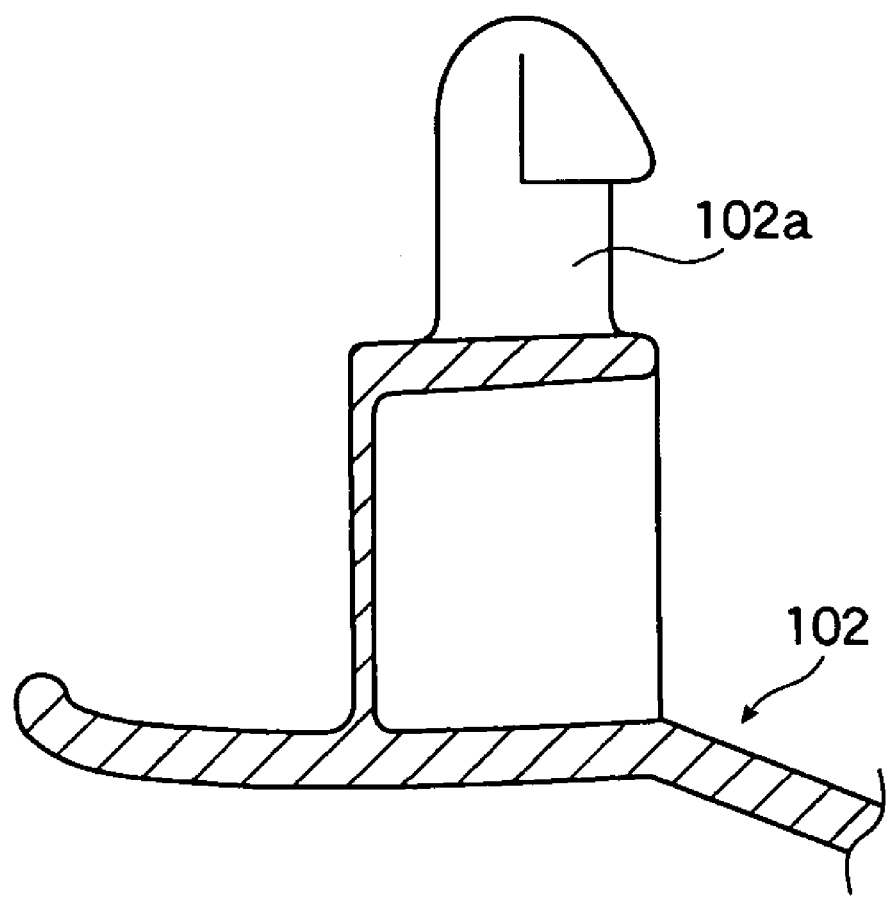
FIG. 26 is a plan view of a fitting pin of the storage box side cover according to the embodiment of the present invention.

The storage box side cover 102 is formed with a fitting pin 102a, at the front end, a retaining hole 102b, at the upper rear edge, and a mounting hole 102c, at the lower part, as shown in FIGS. 24 through 26.

The storage box side cover 102 is mounted to the bracket 100 in a way such that the fitting pin 102a is fitted in a fitting slot 103a formed in a gusset 103 which connects the head pipe 59, the main frame 65 and the down tube 66, as shown in FIGS. 19 and 20. The retaining hole 102b disengageably receives a retaining pin 104 formed on the main frame 65 shown in FIGS. 19 and 20 and a bolt 105 is inserted in the mounting hole 102c and screwed in a nut (not shown).

As discussed above, in this embodiment, the fuel tank 53 has the two-piece structure made up of the lower panel and the upper panel. Thus, compared with the one made up of three parts seam-welded together, the number of parts can be reduced, effort can be saved in welding and finishing processes, and reduction in the number of press dies provides reduction in die cost. Further, since the lower and the upper panels are joined together at the flanges 53c, 53d formed at the side peripheral edges, the fuel tank is easily formed.

Further, since the fuel tank is divided into the lower and the upper panels, which means that no welding portions are formed in the upper surface portion 53j, the upper surface portion 53j can be formed in any desired shape, which improves flexibility in molding.

Further, the lower panel and the upper panel at the side peripheral edges are formed with the flanges 53c, 53d. Those flanges 53c, 53d are covered with the tank side covers 78 having a specified vertical width so that they can be reliably covered. This ensures quality in appearance, compared with when a protection member having a small width is fitted as in the prior art.

Further, the upper surface portion 53j of the upper panel 53b assumes a mountainous shape in a section taken along the lateral direction of the vehicle, with the line which runs in the longitudinal direction of the vehicle along the central portion in the lateral direction, as the edge line 53k. This can improve the rigidity of the fuel tank 53 and allows a sharp design, which improves quality in appearance.

Further, the fuel tank 53 is disposed to be inclined along the main frames 65 extending obliquely downward to the rear from the head pipe 59, and the fuel tank 53 is formed to be sloped such that the flanges 53c, 53d at the front edge 53e side are placed at a lower position than at the rear edge 53f side when the fuel tank 53 is placed with the upper surface portion 53j positioned generally horizontally. This allows the front edge 53e of the flanges to be mounted to the main frames 65 and the rear edge 53f, to the seat frames 70, which improves strength required to support the fuel tank 53. Further, the seat side cover 93 at the mounting hole 93a side and the tank side cover 78 at the mounting hole 78c side are fastened together to the body frame 51. This can reduce the man-hour required for mounting works and improve the accuracy in aligning the mating portions of the seat side cover 93 with the tank side cover 78, which improves quality in appearance.

Further, the storage box 96 is disposed in a space defined closely behind the head pipe 59 and between the fuel tank 53 and the upper part of the engine 52, and the regions on the sides of the storage box 96 are covered with the removable storage box side covers 102. This allows the effective use of the space and thus to secure the storage space.

Figure 27:
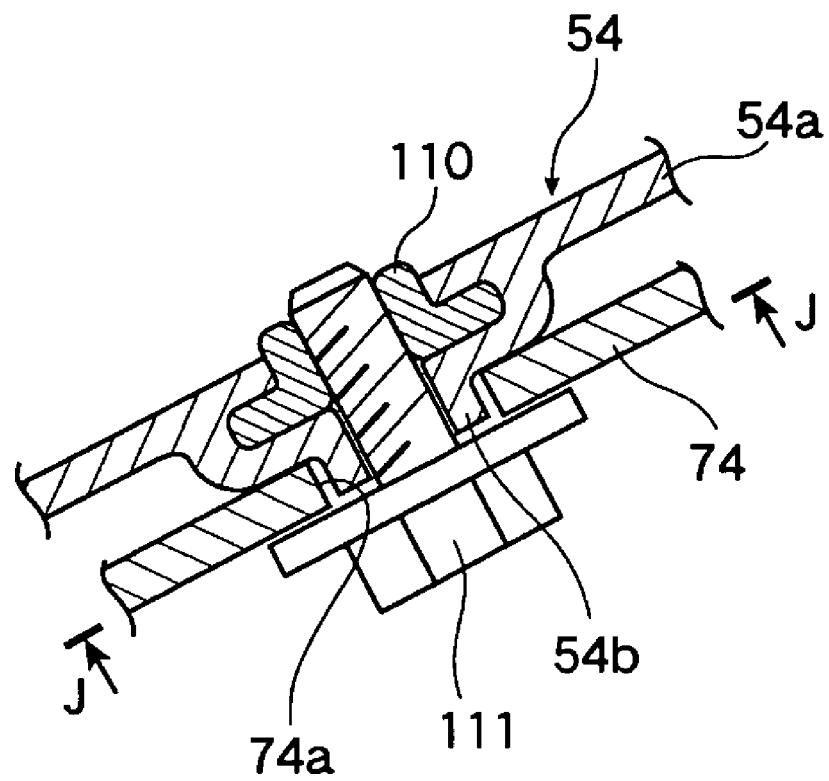
FIG. 27 is a sectional view, showing the state of a seat bottom according to the embodiment of the present invention being mounted.
Figure 28:
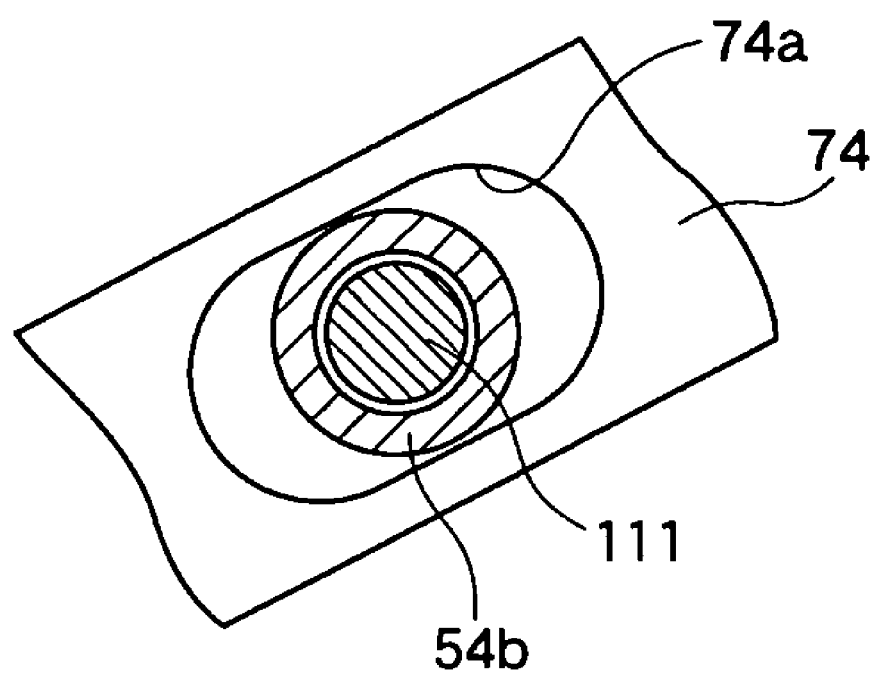
FIG. 28 is a sectional view, taken along line J-J of FIG. 27 according to the embodiment of the present invention.

Further, FIGS. 27 and 28 show the mounting structure of a bottom 54a of the seat 54 to the body frame 51. The plastic bottom 54a is embedded with a nut 110 and formed with a projecting portion 54b projecting downward. The bottom 54a is mounted in a way such that a bolt 111 is screwed in the nut 110, with the projecting portion 54b inserted in a mounting hole 74a having the shape of a longitudinal slot which is formed in the cross member 74.

In such a structure, the projecting portion 54b prevents the bolt 111 from being directly in contact with the cross member 74. This prevents the threaded portion of the bolt 111 from being broken. Also, since the projecting portion 54b is fitted in the mounting hole 74a when the seat 54 is disposed, the seat 54 can be easily positioned, and the bolt 111 can be easily screwed in the nut 110.

Incidentally, in the above embodiment, the upper surface portion 53j of the upper panel 53b is formed in a mountainous shape with the edge line 53k running along the top. The fuel tank, however, is not limited to this embodiment. In FIG. 16, the dimension R of the mountainous top may be smaller than the height h, the distance from the bottom to the top, of the fuel tank. This can also improve the rigidity of the fuel tank 53 and allows a sharp design, which improves quality in appearance. Further, the upper surface portion of the upper panel is not particularly limited to the mountainous shape but can be formed in various shapes.

The invention claimed is:

1. A fuel tank for a straddle-type vehicle, comprising:
   a two-piece structure made up of a lower panel and an upper panel, each panel having a flange which is formed at a side peripheral edge thereof, wherein each flange extends in a horizontal direction and is joined with the other flange in a vertical direction to form the fuel tank;

side portions provided with tank side covers each having a specified vertical width to cover the flanges, wherein the fuel tank is located in a manner such that the upper panel is exposed upward at an upper surface portion; and a storage box disposed in a space defined closely behind a head pipe and between the fuel tank and an engine, wherein regions on sides of the storage box are covered with removable storage box side covers.

2. The fuel tank for a straddle-type vehicle according to claim 1, wherein the fuel tank is disposed to be inclined along main frames extending obliquely downward in a rearward manner from the head pipe, and the fuel tank is formed to be sloped such that the flanges at a front edge side are placed at a lower position than at a rear edge side when the fuel tank is placed with the upper surface portion positioned generally horizontally.

3. The fuel tank for a straddle-type vehicle according to claim 2, wherein a front edge of the flanges is mounted on the main frames at inclined portions, and a rear edge of the flanges is mounted on seat frames for supporting a seat, at horizontal portions.

4. The fuel tank for a straddle-type vehicle according to claim 2, wherein the tank side cover at a lower end side extends downward of the fuel tank, while seat side covers are disposed at sides of a seat behind the fuel tank, and wherein the seat side cover at a mounting portion and an extended portion of the tank side cover, at the mounting portion, are fastened together to a body frame.

5. The fuel tank for a straddle-type vehicle according to claim 1, wherein the tank side cover at a lower end side extends downward of the fuel tank, while seat side covers are disposed at sides of a seat behind the fuel tank, and wherein the seat side cover at a mounting portion and an extended portion of the tank side cover, at the mounting portion, are fastened together to a body frame.

6. The fuel tank for a straddle-type vehicle according to claim 1, wherein the fuel tank is located closely behind the head pipe of the vehicle.

7. A fuel tank for a straddle-type vehicle, comprising:
a two-piece structure made up of a lower panel and an upper panel, each panel having a flange which is formed at a side peripheral edge thereof and joined with the other flange to form the fuel tank, wherein the fuel tank is located in a manner such that the upper panel is exposed upward at an upper surface portion, and wherein the upper surface portion of the upper panel has a mountainous shape in a section taken along a lateral direction of the vehicle, with a line which runs in a longitudinal direction of the vehicle, as an edge line; and a storage box disposed in a space defined closely behind a head pipe and between the fuel tank and an engine, wherein regions on sides of the storage box are covered with removable storage box side covers.

8. The fuel tank for a straddle-type vehicle according to claim 7, wherein the fuel tank is disposed to be inclined along main frames extending obliquely downward in a rearward manner from the head pipe, and the fuel tank is formed to be sloped such that the flanges at a front edge side are placed at a lower position than at a rear edge side when the fuel tank is placed with the upper surface portion positioned generally horizontally.

9. The fuel tank for a straddle-type vehicle according to claim 8, wherein a front edge of the flanges is mounted on the main frames at inclined portions, and a rear edge of the flanges is mounted on seat frames for supporting a seat, at horizontal portions.

10. The fuel tank for a straddle-type vehicle according to claim 7, wherein the fuel tank is located closely behind a head pipe of the vehicle.

11. A fuel tank for a straddle-type vehicle, comprising:
two parts, vertically divided, a lower panel configuring a lower part and an upper panel configuring an upper part, the fuel tank formed with the lower panel and the upper panel joined together at flanges which are formed at side peripheral edges, and the fuel tank Located in a manner such that the upper panel is exposed upward at an upper surface portion, and wherein the upper surface portion of the upper panel assumes a mountainous shape in a section taken along a lateral direction of the vehicle, and a radial dimension R of the mountainous shape is smaller than a height of the fuel tank, wherein the height is a distance from a bottom portion to a top portion of the fuel tank; and a storage box disposed in a space defined closely behind a head pipe and between the fuel tank and an engine, wherein regions on sides of the storage box are covered with removable storage box side covers.

12. The fuel tank for a straddle-type vehicle according to claim 11, wherein the fuel tank is disposed to be inclined along main frames extending obliquely downward in a rearward manner from the head pipe, and the fuel tank is formed to be sloped such that the flanges at a front edge side are placed at a lower position than at a rear edge side when the fuel tank is placed with the upper surface portion positioned generally horizontally.

13. The fuel tank for a straddle-type vehicle according to claim 12, wherein a front edge of the flanges is mounted on the main frames at inclined portions, and a rear edge of the flanges is mounted on seat frames for supporting a seat, at horizontal portions.

14. The fuel tank for a straddle-type vehicle according to claim 11, wherein the fuel tank is located closely behind a head pipe of the vehicle.

\* \* \* \* \*